(12) United States Patent
Muharemovic et al.

(10) Patent No.: US 7,336,647 B2
(45) Date of Patent: Feb. 26, 2008

(54) SYSTEM AND METHOD FOR RANGING

(75) Inventors: Tarik Muharemovic, Dallas, TX (US);
Sundararajan Sriram, Plano, TX (US); David Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 133 days.

(21) Appl. No.: 11/369,756

(22) Filed: Mar. 7, 2006

(65) Prior Publication Data

US 2007/0060180 A1  Mar. 15, 2007

Related U.S. Application Data

(60) Provisional application No. 60/659,286, filed on Mar. 7, 2005.

(51) Int. Cl.
*H04Q 7/20* (2006.01)

(52) U.S. Cl. ............ 370/350; 370/328; 370/330; 370/343; 370/329; 370/310; 370/210; 455/502; 455/500; 455/403; 455/422.1; 455/426.1; 455/69

(58) Field of Classification Search ............... 370/350, 370/345, 343, 329, 328, 331, 336, 203, 210, 370/310, 515, 330; 455/500, 502, 69, 522, 455/67.11, 422.1, 403, 466, 426.1, 426.2
See application file for complete search history.

(56) References Cited

U.S. PATENT DOCUMENTS

| | | | |
|---|---|---|---|
| 2005/0135230 A1* | 6/2005 | Yu et al. | 370/210 |
| 2005/0286465 A1* | 12/2005 | Zhuang | 370/329 |
| 2005/0286485 A1 | 12/2005 | Zhuang | |
| 2005/0286547 A1* | 12/2005 | Baum et al. | 370/437 |

\* cited by examiner

*Primary Examiner*—Keith Ferguson
(74) *Attorney, Agent, or Firm*—Steven A. Shaw; W. James Brady; Frederick J. Telecky, Jr.

(57) ABSTRACT

A system operable for ranging synchronization is provided. The system includes a first component that is operable to analyze a set of signals. The first component is operable to determine a subset of the set of signals based on a condition, at least some of the set of signals including ranging codes. The system also includes a second component that is operable to receive the subset of the set of signals and to determine a preferred candidate of ranging codes.

23 Claims, 7 Drawing Sheets

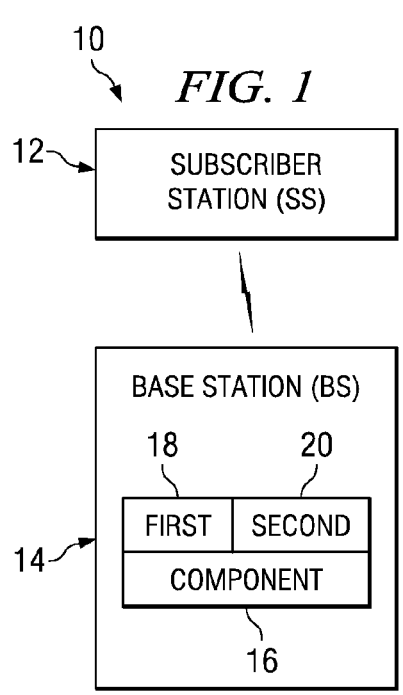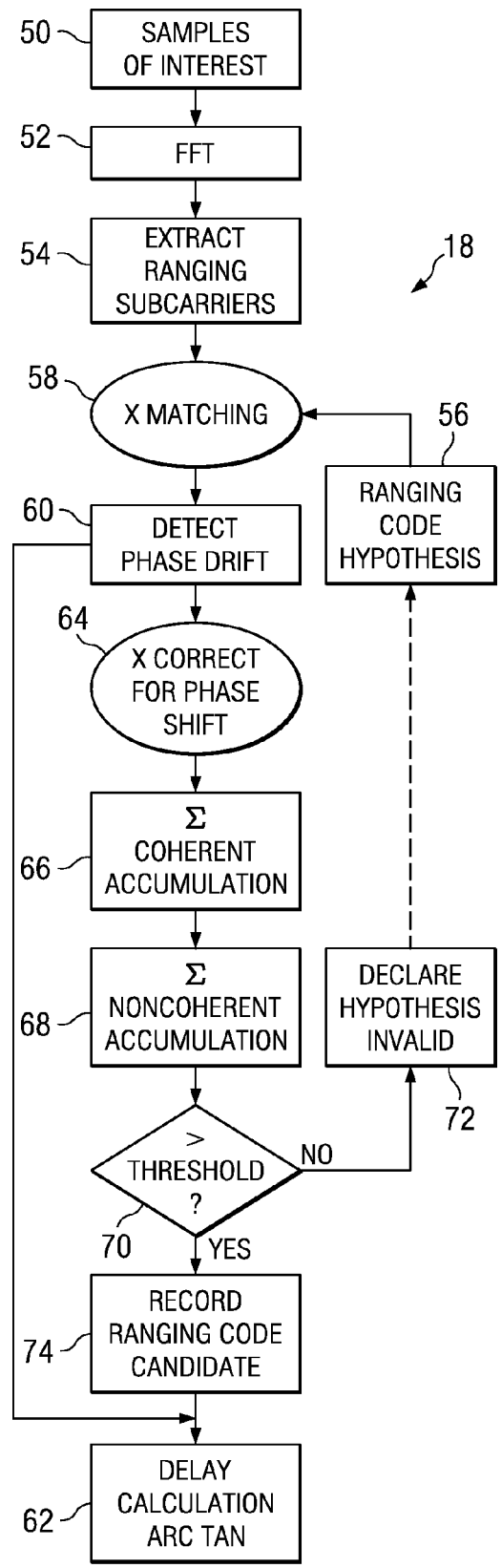

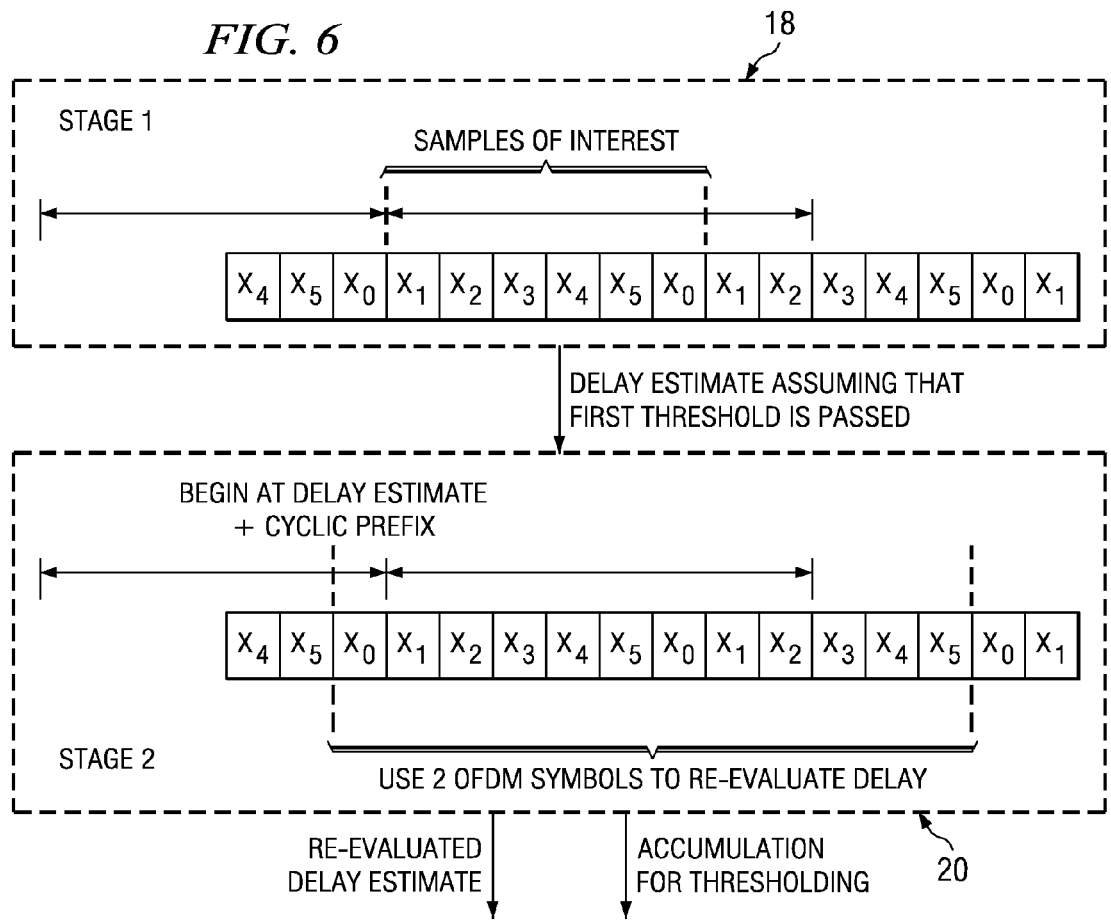
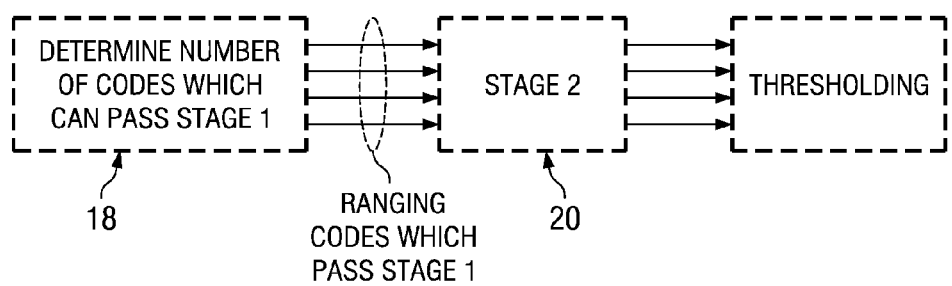

SYSTEM AND METHOD FOR RANGING

CROSS-REFERENCE TO RELATED APPLICATIONS

This application claims priority to U.S. Provisional Application No. 60/659,286, filed Mar. 7, 2005, entitled Receive Physical Layer Algorithms for WiMAX Ranging, Tarik Muharemovic et al. inventors, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to wireless communications, and more particularly, but not by way of limitation, to a system and method for ranging.

BACKGROUND OF THE INVENTION

WiMAX (Worldwide Interoperability for Microwave Access) is a cellular-based wireless multiple access standard, which is geared towards a series of applications, such as last mile broadband wireless connections, enterprise connectivity for businesses, and many others. Typical WiMAX base station (BS) installation will provide connections for subscriber stations (SS) within, for example, a five mile cell radius. The WiMAX standard defines several options for the physical layer (PHY), but the modulation of choice is typically Orthogonal Frequency Division Modulation (OFDM) or Orthogonal Frequency Division Multiple Access (OFDMA), details of which are found in the WiMAX physical layer specifications, IEEE Standard 801.16d, Part 16, "Air Interface for Fixed Broadband Wireless Access Systems", and IEEE Standard 802.16e, Part 16, "Air Interface for Fixed and Mobile Broadband Wireless Access Systems", both of which are incorporated herein by reference for all purposes. Although WiMAX is used in several of the examples provided herein, the present disclosure should in no way be limited to WiMAX or other wireless standards.

"Ranging" is a process by which a subscriber station (SS) initially synchronizes with the network, a process by which a SS remains synchronized to the network, a process by which a SS requests up-link (UL) bandwidth allocations, and a process by which a SS can handoff from one BS to another. A particular subscriber station uses the initial ranging process in order to register itself with a base station.

The ranging process is described as follows. A pre-defined set of 256 pseudo-noise "ranging codes" is divided into four groups: initial ranging, periodic ranging, bandwidth request ranging and handover. Each pseudo-noise ranging code has a length of 144 bits. A particular base station broadcasts in the downlink direction:

1) Ranging codes which are used for the initial ranging process, and
2) A ranging channel which contains 144 frequency subcarriers for the Ranging SS transmission.

Whenever a subscriber station desires to register itself with a base-station, the subscriber station observes the broadcasted codes and randomly selects one code from the entire group. Note that this group has 256 elements at most. Upon selecting a ranging code, the subscriber station will modulate it across the 144 frequency subcarriers which were also defined by the base station. In turn, the base station will monitor the ranging channel and attempt to detect which ranging codes (out of 256 codes) are being transmitted by the subscriber stations in its sector. Furthermore, the base station will attempt to get initial delay estimates of each subscriber station which is trying to register.

To complete the ranging procedure, the base station will next re-send the detected ranging code in the downlink direction. This ensures that the subscriber station knows that its registration is complete.

The 144 subcarriers which are dedicated for ranging are not typically a contiguous set of subcarriers but rather a distributed set across the available spectrum. In WiMAX, for example, they are partitioned into 36 groups of 4 contiguous subcarriers each. Each group of four contiguous subcarriers is called a "Tile." Tiles are not contiguous between each other. The intent behind this system design strategy (non-contiguous tiles) is to provide SS transmission with frequency diversity, thereby combating the frequency-selective fading.

Subcarriers which are left blank are not used for the ranging process. Rather, their purpose is transmission of information, but only for subscribers which are already registered at the base station. The particular subscriber station which is currently registering will zero the values for those subcarriers.

Upon selecting a ranging code, a WiMAX compliant subscriber station will modulate it (the ranging code) across the 144 frequency subcarriers, using two OFDM symbols. Let N denote the total number of subcarriers within the WiMAX bandwidth. First, the (N−144) non-ranging subcarriers are filled with zeros. Second, the 144 ranging subcarriers are BPSK (Binary Phase Shift Keying) modulated with the selected ranging code. To compute the time-domain transmission, the inverse Fourier transform (IFFT) is taken for the entire sequence of length N. The result of the inverse Fourier transform is the time-domain signal, which we denote as $X_0 \ldots X_{N-1}$. Once the IFFT signal has been computed, $N_{cp}$ samples from the end of the time-domain signal are pre-pended to the N time-domain samples to form the cyclically shifted, time-domain signal. These $N+N_{cp}$ samples are then transmitted by the subscriber station.

The figure has N=6 and $N_{cp}$=2 only for the sake of illustration. In general, the number N is a power of 2 so that the total number of samples within the OFDM symbol is a power of 2. Also, N is much larger (for example, N=2048). Also, the cyclic prefix above is shown having only two samples, but typically the cyclic prefix is only a fraction of the OFDM symbol (such as $N_{cp}$=N/4).

The subscriber station may be located anywhere within, for example, a five mile cell radius, away from the BS. Because of the propagation delay, the ranging transmission is not received timely at the base station. Rather, the BS will measure the delayed version of the ranging transmission. In turn, the Unknown Delay will correspond to the location of the subscriber station.

As seen on the above Example, the incoming ranging signal is received with an Unknown Delay at the base station. The Unknown Delay cannot be represented as an integer number of discrete samples because of the clock differences in the BS and Mobile Subscriber Station (MSS)

and because of multi-path propagation of the transmitted signal. As a result, the Unknown Delay has certain delay spread associated with it. Therefore, the Unknown Delay presents a significant difficulty which prevents direct demodulation and detection. Upon measuring the received antenna signal, the task of the base station is to determine which ranging code is being used (if any) and furthermore, which delay does the code arrive with.

Since WiMAX is a non-profit organization working towards interoperability standards for broadband products and whose standards are a work in progress, most algorithms and solutions may be proprietary to various companies. One receive solution, however, is well-known time domain matched filter. With a time-domain matched filter, the received samples are passed through the filter whose impulse response if derived from the transmission itself. The peak output of the matched filter is detected, which gives the transmission delay. A well-documented problem with this solution is its complexity. In particular, the receiver would have to search over all ranging codes and all delays so that it would require 256 matched filters running in parallel. This solution turns out to be too intensive for current hardware. Other solutions, such as the Schmidl algorithm (for example), do result in a very low complexity receiver, but also impose a 3 dB noise enhancement.

SUMMARY OF THE INVENTION

According to one embodiment, a system operable for ranging synchronization is provided. The system includes a first component that is operable to analyze a set of signals. The first component is operable to determine a subset of the set of signals based on a condition, at least some of the set of signals including ranging codes. The system also includes a second component that is operable to receive the subset of the set of signals and to determine a preferred candidate of ranging codes.

According to another embodiment, a method for ranging is provided. The method includes a subscriber station transmitting a signal including a ranging code, and a base station receiving the signal from the subscriber station. The method includes identifying, based on at least one condition, a subset of possible candidate ranging codes from 256 ranging codes. The method also includes selecting a preferred ranging code from the subset of possible candidate ranging codes.

In other embodiments, a base station is provided that is operable for ranging synchronization with a subscriber system. The base station includes a component to analyze a signal to determine a ranging code of the signal. The component analyzes a second symbol received within a time period. The second symbol being at least part of the signal. The component is further operable to analyze a phase shift aspect of the signal and use at least one threshold condition to determine possible ranging codes.

In still other embodiments, another base station is provided for ranging synchronization with a subscriber system. The base station includes a component operable to compare ranging codes in at least some of a set of received signals to at least some of a set of possible ranging codes to determine preferred candidate ranging codes. The component tests a signal window that is two (2) symbols in length. A step size of two (2) times the cyclic prefix is used for each successive two (2) symbol length signal window tested by the component.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 illustrates a block diagram of a system according to one embodiment of the present disclosure.

FIG. 2 is a flow-chart of a first component for promoting ranging synchronization according to one embodiment of the present disclosure.

FIG. 6 is a diagrammatic illustration of initial ranging transmission separated into a first and second stages.

FIG. 7 illustrates another two stage method for ranging synchronization according to another embodiment of the present disclosure.

DETAILED DESCRIPTION OF THE PREFERRED EMBODIMENTS

Figure 3:
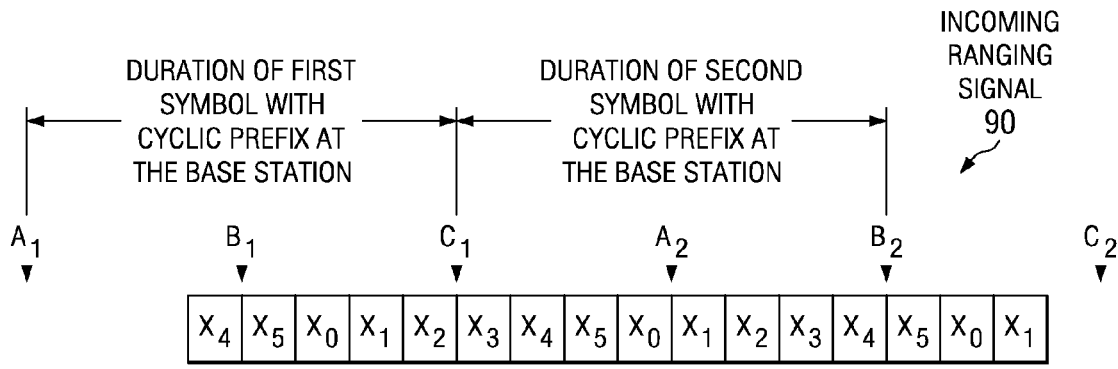
FIG. 3 is a diagrammatic illustration of an initial ranging signal with sample windows according to another embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

The present disclosure provides a base station receiver methodology and algorithms for the initial ranging process. Furthermore, the enclosed techniques and algorithms define a methodology for initial time-delay estimation (performed by the base station) for the subscriber station which is being registered by the current ranging process.

More specifically, the present disclosure provides at least four receive ranging algorithms, which provide a span of various tradeoffs between performance and complexity. The algorithms may be implemented on the base station as an application specific integrated circuit (ASIC), executable software or instructions that may be processed by a processor, or in other methods or medium which will readily suggest themselves to one skilled in the art. The algorithms, according to one embodiment, may be based on code detection in the frequency domain, jointly coupled with a delay estimation procedure. When a Fourier transform is taken at the BS receiver, the Unknown Delay will become unknown phase shift. This phase shift is linear with respect to the subcarrier index of the OFDM symbol and is based on Fourier analysis. Some of the disclosed algorithms combine all or portions of other algorithms and may be modified to achieve certain efficiencies.

FIG. 1 illustrates a block diagram of one embodiment of a system 10 operable for ranging synchronization. The system includes a subscriber station (SS) 12 in communication for ranging synchronization with a base station (BS) 14. The subscriber system 12 may be a set-top box, mobile or wireless telephone or handset, personal digital assistant (PDA), or other mobile or stationary wireless device, computer, or system. The base station 14 includes a component 16 operable for ranging synchronization. The component 16 includes a first subcomponent or first component 18 that is operable to analyze a set of signals. The first component 18 determines, for example by using a conditional requirement such as a threshold value, a subset of the set of signals. The component 16 also includes a second subcomponent or second component 20 that receives the subset of the set of signals and determines a preferred candidate of ranging codes. Although only two subcomponents of component 16 are shown, the component 16 may use only one of the first and second components 18, 20, or may comprise multiple components, stages, systems, algorithms, and so on.

FIG. 2 illustrates a flow-chart of one implementation of the first component 18, which may also be referred to as Algorithm 1. The present disclosure identified, from Example 3 above, that even for the typically worst-case cell radius of approximately five miles, the Unknown Delay should not exceed the duration of the first OFDM symbol. For this reason, the base station 14 receiver may ignore the first OFDM symbol and focus primarily or exclusively on the second OFDM symbol (according to the time reference of the base station), all samples for one transmitted OFDM symbol will be collected. The time reference or component may be the symbol time, such as the duration of the symbol with cyclic prefix at the base station 14. Parameters which the receiver needs to detect (in this case) are the actual code, as well as the circular shift which stems from Unknown Delay.

The implementation or method of the first component 18 includes obtaining samples of interest (at block 50), which are from the second OFDM symbol as measured by the base station 14. The method includes taking the FFT (Fast Fourier Transform) (at block 52) of the samples, and extracting (at block 54) 144 ranging subcarriers. The method then hypothesize a ranging code (at block 56), which may include selecting one of the 256 possible ranging codes to compare with the current signal. The method includes comparing or matching (at block 58) the signal to the hypothesized ranging code. If the hypothesis is correct, the effect will be to undo the transmit modulation. If however, the hypothesis is incorrect, a noisy signal will be observed.

Detecting the phase shift (at block 60) may be, in some embodiments, a fundamental aspect of the method of the first component 18. As mentioned above, the phase shift comes from the Unknown Delay. In essence the unknown phase shift means that consecutive subcarriers are phase-shifted. By focusing on a particular tile, for example Tile 1 illustrated above, there are four subcarriers observed (after FFT, ranging subcarrier or tone extraction, and matching). Due to the Unknown Delay, these four subcarriers experience a phase shift. In other words, the observation (after FFT, ranging subcarrier extraction, and matching) for the tile k is given as:

$$y[m,k]=h[k]e^{jm2\pi j\phi}+\eta[m,k]$$

Here, m={0,1,2,3} is the subcarrier index within a tile k. Each Tile has approximately the same fading coefficient h[k], due to the subcarrier proximity. However, the phase shift mφ is introduced across tiles. Also, η[m,k] denotes the additive noise. The phase (φ) can be estimated by computing the phase of the following $$\sum_{k=1}^{36} \left| \sum_{m=1}^{4} y[m,k]e^{-jm2\pi j\hat{\phi}} \right|^2$$

The advantage of this approach (Algorithm 1) is that in fact we don't need to search over all possible values for Unknown Delay. Rather, the delay offset is computed (at block 62) using the above formula, as discussed below. Furthermore, the above equation may be derived from generalized maximum likelihood with certain approximations. However, this calculation is not shown here, and the present disclosure is not so limited. Computing the phase shift is now complete.

After computing the phase shift, the next block (at block 64) corrects for the phase shift by applying the rotation to y[m,k]. The purpose of correcting the phase shift and coherent+non-coherent accumulations (at blocks 66 and 68) is to compute the following:

$$\hat{\varphi} = \text{phase}\left(\sum_{k=1}^{36} y[0,k]*y[1,k]+y[1,k]*y[2,k]+y[2,k]*y[3,k]\right)$$

Alternatively, the square in the above equation may be replaced by simple absolute value. This decision statistic is compared (at block 70) against a threshold, and if it is exceeded, then the code hypothesis is declared valid. The threshold serves to trade off the false alarm probability against the detection probability. Thus the threshold may be adjusted to achieve greater accuracy, but with lower performance characteristics. In some embodiments, valid signals may be identified to create, for example, a subset of possible matching ranging code candidates. In still other embodiments, the threshold may have one or more conditions, which will be discuss in greater detail below. If the threshold value is not exceeded then the code is declared invalid (at a block 72) and the method returns to block 56 for selection of the next or another ranging code for analysis. In some embodiments, delay estimates are computed only for the valid ranging codes. In other embodiments, no delay estimates may be computed by the first component 18, but may be computed elsewhere.

In some embodiments, the ranging synchronization may be accomplished using only the first component 18 and its accompanying method described and illustrated in FIG. 2. In other embodiments, the first component 18, which may includes all or only portions of the first component 18, may be used in conjunction with one or more other components, such as the second component 20 to achieve additional efficiencies.

The implementation illustrated in FIG. 2 of the first component 18 may have certain limitations since only one OFDM symbol is being used for ranging code detection. To overcome this drawback, the second component 20 may collect both OFDM symbols and hence gain, for example, an additional 3 dB in performance over the method of the first component 18. FIG. 3 illustrates an initial ranging signal 90 with sample windows $A_1$-$A_2$, $B_1$-$B_2$, and $C_1$-$C_2$ of two (2) OFDM symbols in length.

It will be appreciated that one of the goals of the second component 20 is to search for the window of two consecutive OFDM symbols (at the base station) which have the most power. This search is performed in steps of certain size. The step size, in this embodiment, between $A_1$ and $B_1$, and $B_1$ and $C_1$ is twice the cyclic prefix length. Note that one of the search windows (search window B) will collect the entire two transmitted OFDM symbols. Previously, a matched filter might have been used with a sliding window which would slide the window one sample at a time—a step size of one (1) sample. However, by identifying the periodic nature of the signal, the present disclosure can jump in multiples of the cyclic prefix length. The advantage derived from a step size of twice the cyclic prefix length is that you will eventually and more efficiently obtain 2 symbols, as opposed to stepping through the 2 symbol window size one sample at a time.

Figure 4:
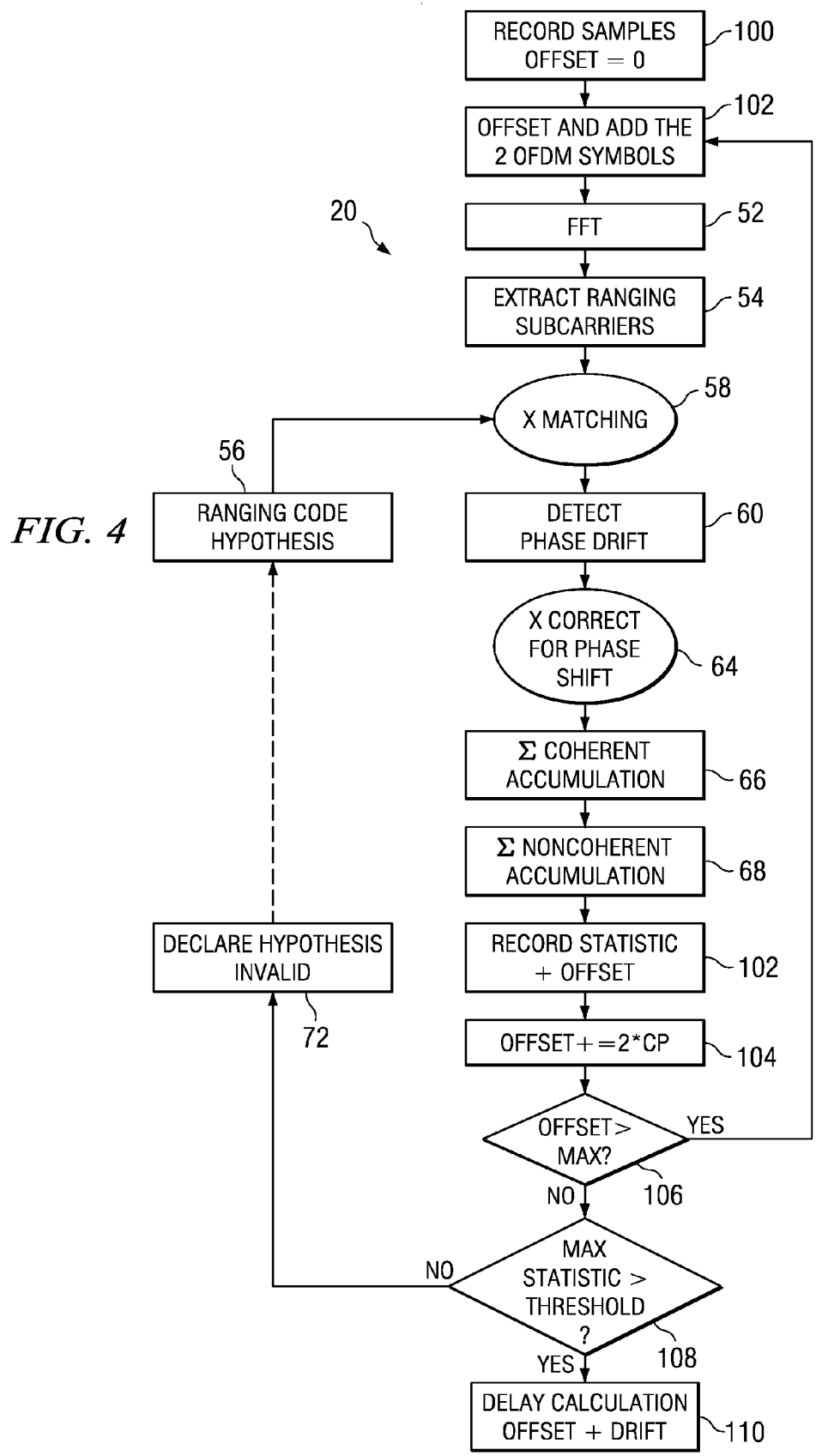
FIG. 4 is a flow-chart of a second component for promoting ranging synchronization according to another embodiment of the present disclosure.

FIG. 4 illustrates the implementation of the second component 20 by a method including using a two (2) symbol sample window and using a step size of twice the cyclic prefix length. The second component 20 and the illustrated method may also be referred to as Algorithm 2. The method (at block 100) obtains the samples of interest and the offset is set to 0. Using the offset, 2 OFDM symbols (at block 102) are sent to the FFT (block 52). A number of the blocks of the method of the second component 20 will not be described since they are substantially similar in function and operation to blocks described in FIG. 2, specifically blocks 52, 54, 56, 58, 60, 64, 66, and 68. The decision statistic and the offset is output and recorded (at block 102). The offset is incremented by twice the cyclic prefix length (at block 104). The offset is compared to a maximum offset (at block 106). The maximum offset is associated with a distance of the origin of the signal, since we are not interested in signals that originated outside of the cell radius of the base station 14. If the offset is less than the maximum, the method returns to evaluate the next 2 OFDM symbol window (at block 102). Otherwise, the maximum statistic is compared to the threshold (at block 108). If the threshold is exceeded, then the code is declared valid and (at block 110) the delay is calculated, which includes the offset and drift.

The second component 20 may be thought of as a brute force analysis for all possible delays which provides considerably greater accuracy, but at a higher computational cost. Further as mentioned above, the second component 20 is expected to give approximately 3 dB performance gain over the first component. However, this performance will come at a cost computational complexity, which is roughly the number of search windows (Three in above example) times more complex than the first component.

Figure 5:
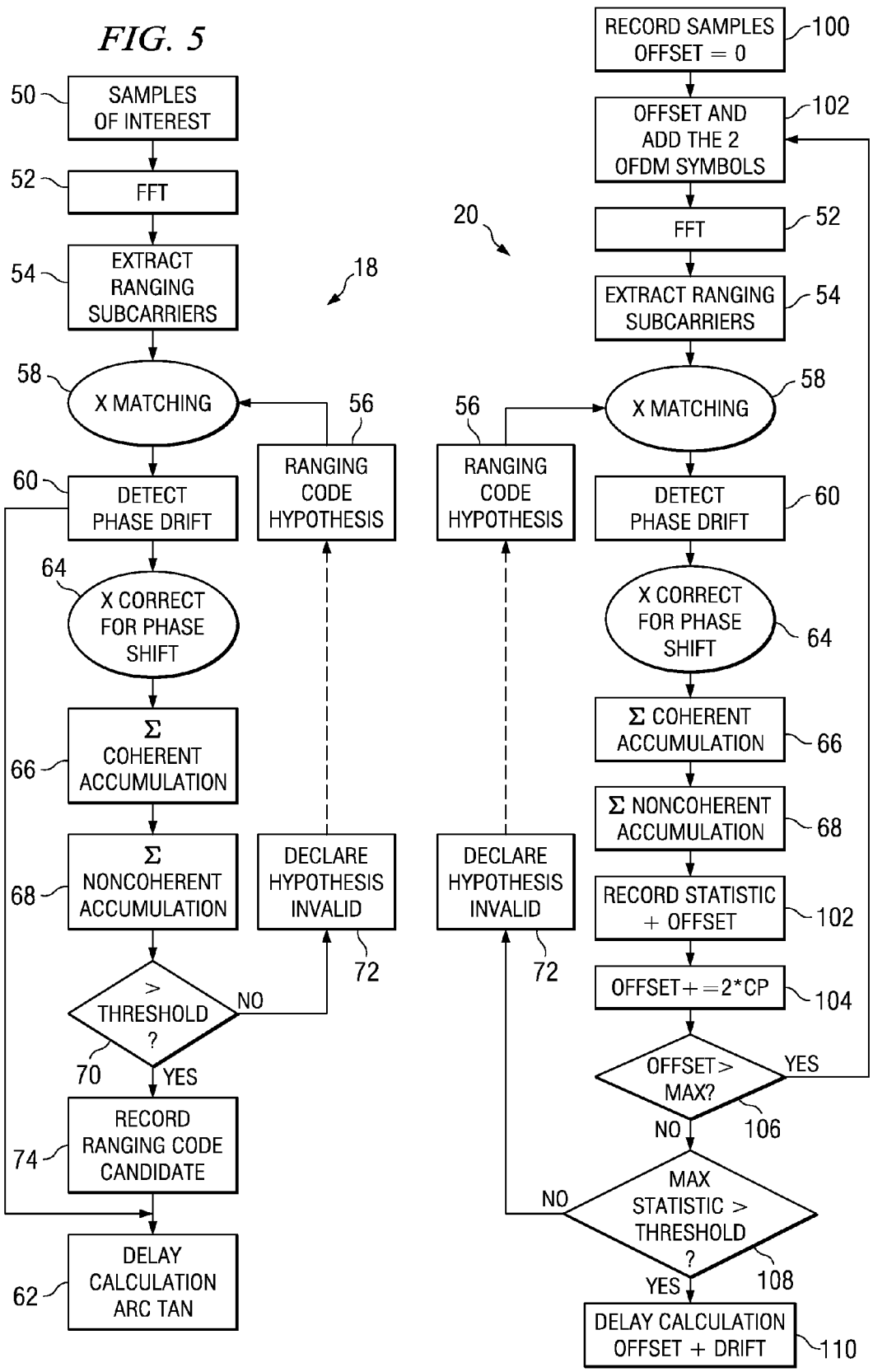
FIG. 5 is a flow-chart of a method for ranging synchronization according to another embodiment that includes aspects of both the first and second components illustrated in FIGS. 2 and 4.

FIG. 5 is a flow-chart illustrating a method 200, which may also be referred to as Algorithm 3, that may be implemented by the base station 14 for ranging synchronization according to another embodiment. The method 200 combines aspects of both the first and second components 18 and 20, as illustrated in FIGS. 2 and 4. This method 200 exploits benefits of both the method used by the first component 18 (low complexity) and that of the second component 20 (performance). The method 200 is based on a two-stage approach, where the method of the first component 18 is used in the first stage, with relatively high false alarm rate and relatively high detection probability. This is obtained by setting the threshold (at block 70) in the first component 18 relatively low. For this reason, several or perhaps numerous ranging codes may be expected to pass the first component 18 threshold (or first stage of method 200) and recorded as a ranging code candidate at block 74.

After evaluating delay estimates and the corresponding code hypothesis which pass the first component 18 threshold (first stage), these codes are re-evaluated at the second component 20 (or second stage of method 200). The second component 20 (second stage) will use accumulation from both OFDM symbols.

The method of the first component 18 (first stage) is substantially similar to that described above with regard to FIG. 2. The second component 20 (second stage) describes one method to re-evaluate both the code and associated delay which has passed through the first component 18 or first stage. One possible mechanism is to use the ranging code candidates from block 74 as the basis set for the ranging code hypothesis in block 56.

FIG. 6 illustrates initial ranging transmission separated in the first and second components 18 and 20 (first and second stages). Based on the delay estimate from the first component 18 (first stage), it can be seen which samples are taken into consideration for the second stage. Note that the second stage will use two OFDM symbols, and that the beginning and the ending are determined by the initial delay estimate (from the method of the first component 18) as well as the cyclic prefix.

It should be appreciated that the number of codes which pass the first component 18 (first stage) can be adjusted to a specific number based on worst case complexity and implementation considerations. For example, the first component 18 (first stage) may screen all the signals and provide a subset of possible candidates to the second component 20 (second stage) based on a threshold setting in the first component 18. The second component 20 (second stage) may then identify the specific preferred candidate ranging code. In some embodiment, the delay estimates may be calculated by both the first and second components 18 and 20 (first and second stages), while in other embodiments, the delay estimate calculated by the first component 18 (first stage) may be used and the second component 20 (second stage) may omit or skip the process of re-evaluating the delay. This may be desirable for a number of reasons including improved efficiency.

FIG. 7 illustrates still an additional embodiment of a method 250 of the present disclosure, which may also be referred to as Algorithm 4. This method 250 is similar in some respects to the method 200 illustrated in FIG. 5 and consists of portions of the first and second components 18 and 20 and is a two-stage procedure. The first component 18 (first stage) is substantially similar to that described in FIG. 5. The number of codes which pass through the first component 18 (first stage) may be limited by accumulation threshold, maximum number of codes or any combination of these criteria.

One difference between the method 250 of the present embodiment illustrated in FIG. 7 and the method 200 illustrated in FIG. 5 is in the second component 20 (second stage). Specifically in this embodiment, no initial delay estimates are passed to the second component 20 (second stage). The first component 18 (first stage) provides only the actual set of ranging codes that passed the first component 18 (first stage). Otherwise, the second component 20 (second stage) is substantially similar to the second component 20 (second stage) illustrated in FIG. 5, except that the second component 20 (second stage) uses only those codes which have already passed the first component 18 (first stage).

It will be appreciated that the goal of the embodiments illustrated in FIGS. 5 and 7 is similar in that they consist of successive refinement or pruning of the set of available ranging codes. The majority of codes are may be expected not to be ranging at the same time, and those codes will be eliminated by the first component 18 (first stage), which is computationally efficient. The second component 20 (second stage) also elaborates on how to reduce the false alarms for those codes which pass the first component 18 (first stage), but are not ranging codes. Thus these final two embodiments allow the user or implementer to create a balance between computational efficiency, based on the one or more thresholds that are used in the first component 18 (first stage) and by providing a limited or manageable number or subset of codes to the second component 20 (second stage).

These embodiments provide the user or implementer with greater flexibility to achieve a desirable balance given the benefits from the combination of the first and second components 18 and 20. For example, the threshold of the first component 18 (first stage) may be adjusted to obtain an optimum accumulation. The threshold may be an actual number of signals included in the subset to be passed to the second component 20 (second stage) for evaluation. In other embodiments, the threshold may be a combination of a threshold accumulation and an actual number of codes that may be passed. Other thresholds or combinations may be used and are within spirit and scope of the present disclosure and will readily suggest themselves to one skilled in the art.

Figure 8:
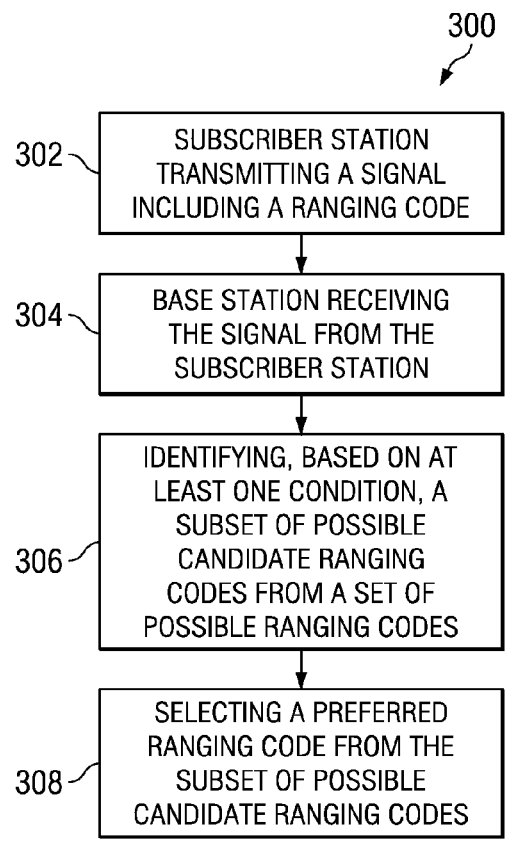
FIG. 8 is a method for ranging synchronization according to another embodiment of the present disclosure.

FIG. 8 illustrates a method 300 for ranging. The method includes (at block 302) a subscriber station transmitting a signal including a ranging code. A base station receives (at block 304) the signal from the subscriber station. The method includes (at block 306) identifying, based on at least one condition, a subset of possible candidate ranging codes from a set of possible ranging codes. The method also includes (at block 308) selecting a preferred ranging code from the subset of possible candidate ranging codes.

The following demonstrates some of the possible tradeoff between false alarm probability and the detection probability for Algorithm 1, Algorithm 2, and Algorithm 3. Algorithm 4 was not simulated because its performance will be similar to that of Algorithm 2, once the allowed number of codes which pass the first component 18 (first stage) is sufficiently large. It will be appreciated that the following data is exemplary only of some of the various embodiments, and the present disclosure is not limited to these performances, embodiments, or embodiments having these characteristics. Other embodiments having other performance characteristics and other tradeoffs are contemplated and within the scope of the present disclosure.

Table 1 gives the channel parameters for the simulation results given in this section. The channel contains three taps, each with their own amplitude and K factor.

TABLE 1

Channel Parameters - Standford University Interim 1

| | Tap 1 | Tap 2 | Tap 3 | |
|---|---|---|---|---|
| Del Spread | 0 | 0.4 | 0.8 | [μsec] |
| Power | 0 | −15 | −20 | [dB] |
| K factor | 18 | 0 | 0 | |
| Doppler | 0.4 | 0.4 | 0.4 | [Hz] |

The following results are for two different input signal to noise ratios. Each simulation averages the detection results for 5000 runs of each algorithm. Only one ranging code is transmitted in these results.

Figure 9:
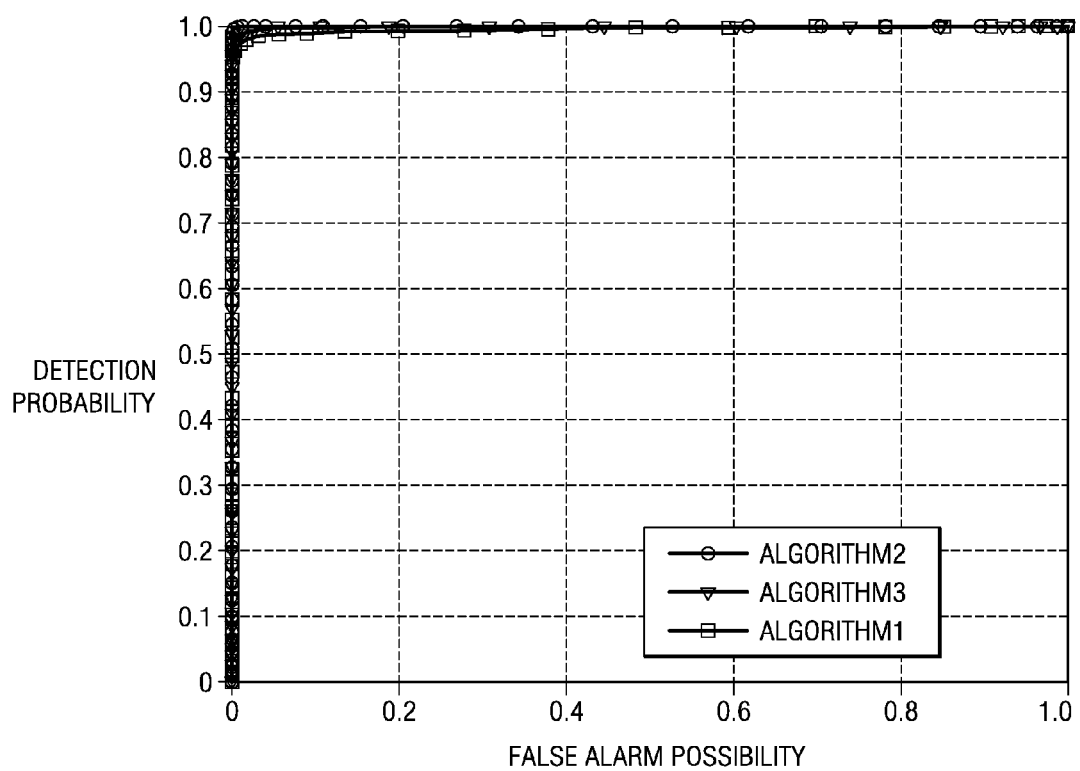
FIG. 9 illustrates the performance of three ranging algorithms according to the present disclosure for a signal to noise ratio (EsNO) of −15 dB.

FIG. 9 illustrates the performance of the three ranging algorithms for a signal to noise ratio (EsNO) of −15 dB. The abscissa denotes the false alarm probability, which is the probability that a ranging code was detected when no signal was transmitted, and the ordinate denotes the detection probability, which is the probability that a ranging code was detected when a ranging code was transmitted. For this level of EsNo, Algorithm 3 performs substantially as well as Algorithm 2.

Figure 10:
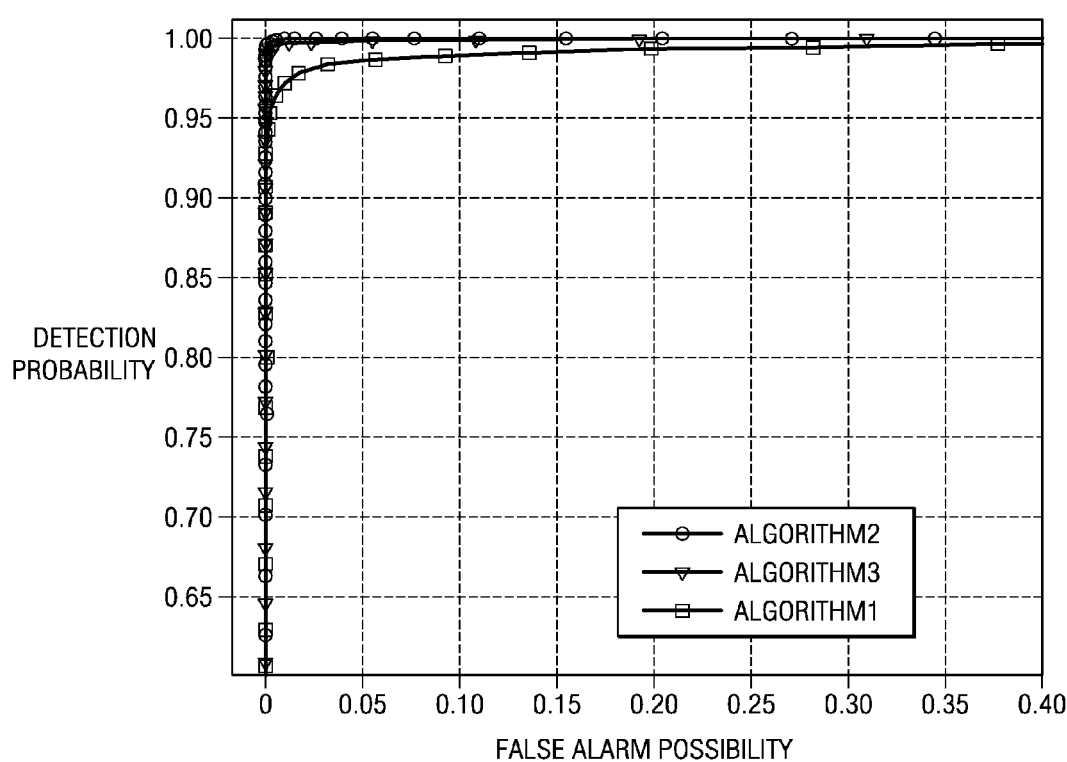
FIG. 10 is an enlargement of an area of interest of the chart of FIG. 9.

FIG. 10 shows an enlargement of the critical region near a detection probability of one and a false alarm probability of zero. Notice that Algorithm 3 still performs substantially as well as Algorithm 2 in this region.

Figure 11:
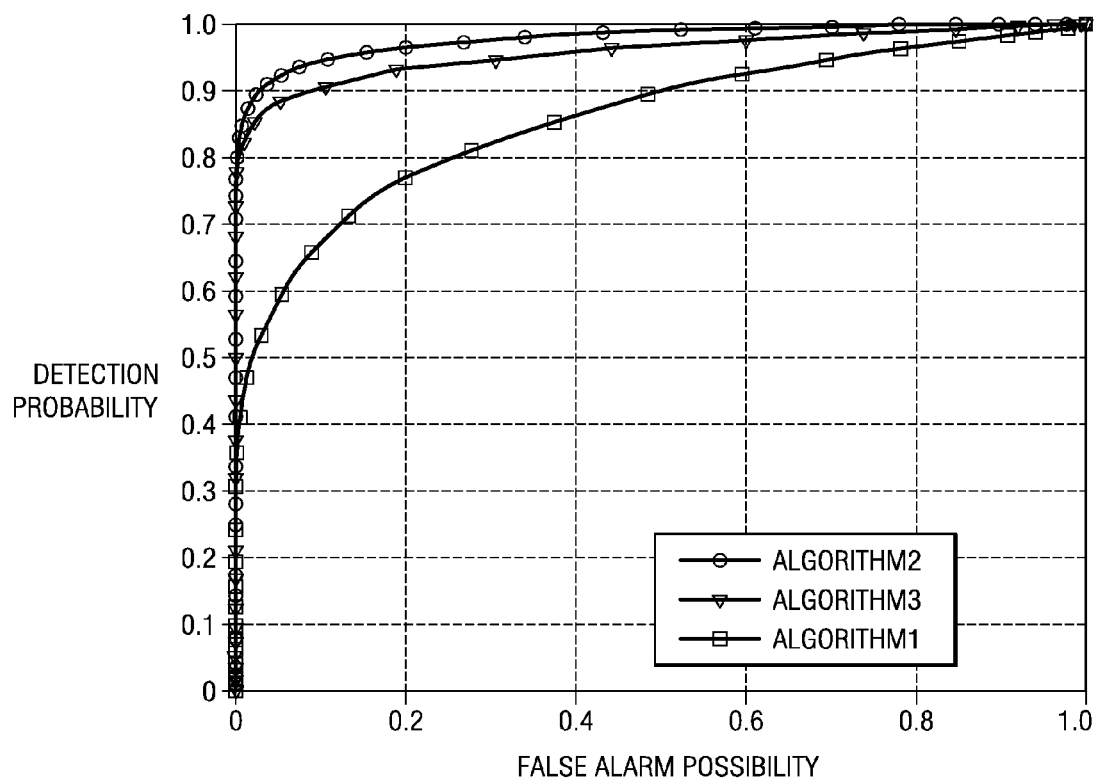
FIG. 11 illustrates the performance of three ranging algorithms according to the present disclosure for a signal to noise ratio (EsNO) of −20 dB.

FIG. 11 shows the performance of the three ranging algorithms of the present disclosure for a signal to noise ratio (EsNO) of −20 dB. At this level of EsNO, Algorithm 3 may not perform as well as Algorithm 2 as the false alarm probability approaches zero. At this level of signal to noise ratio, the first stage of Algorithm 3 may incorrectly detect some ranging codes that get passed to Stage 2 of the algorithm. However, at this level of signal to noise ratio, the performance of the algorithm (within 0.8 dB at low false alarm probability) is acceptable.

Figure 12:
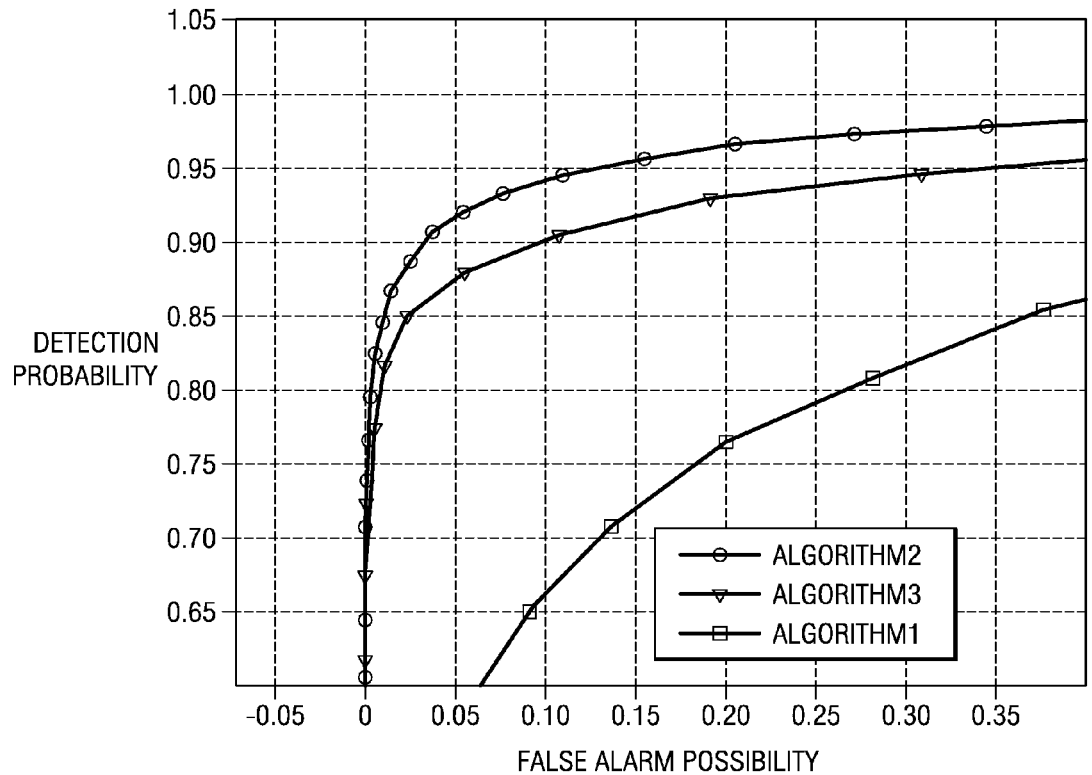
FIG. 12 is an enlargement of an area of interest of the chart of FIG. 11.

FIG. 12 shows an enlargement of the critical region near a detection probability of one and a false alarm probability of zero. Notice that Algorithm 3 has a detection probability that is about 0.8 dB worse than Algorithm 2 in this region. However, at this level of signal to noise ratio, the performance is acceptable given the level of complexity.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system operable for ranging synchronization, comprising:
   a first component operable to analyze a set of signals and determine a subset of the set of signals based on a condition, at least some of the set of signals including ranging codes; and
   a second component operable to receive the subset of the set of signals and to determine a preferred candidate of ranging codes.

2. The system of claim 1, wherein the condition used by the first component to determine the subset of signals is a threshold accumulation.

3. The system of claim 1, wherein the condition used by the first component to determine the subset of signals is a threshold number of signals to include in the subset of signals.

4. The system of claim 1, wherein the condition used by the first component to determine the subset of signals includes both a threshold accumulation and a threshold number of signals to include in the subset of signals.

5. The system of claim 1, wherein the condition is a threshold signal to noise ratio (SNR).

6. The system of claim 1, wherein at least some of the set of signals are further defined as one of an OFDM (Orthogonal Frequency Division Modulation) and OFDMA (Orthogonal Frequency Division Multiple Access) signals.

7. The system of claim 1, wherein the first component is operable to ignore at least part of a first symbol and analyze a second symbol, the second symbol received within a time period and the second symbol being a part of at least one of the set of signals.

8. The system of claim 7, wherein the time period is defined as a duration of a symbol with cyclic prefix received at a base station.

9. The system of claim 7, wherein the first component is further operable to analyze a phase shift aspect of at least some of the signals to promote determining the subset of signals.

10. The system of claim 1, wherein the second component is operable compare the ranging codes in at least some of the signals to at least some of a set of possible ranging codes to determine the preferred candidate of ranging codes.

11. The system of claim 1, wherein the first component is further operable to estimate a signal delay associated with each of the subset of signals that include possible candidates of ranging codes.

12. The system of claim 1, wherein the second component is further operable to estimate a signal delay associated with the preferred candidate of ranging codes.

13. The system of claim 1, wherein the first component is operable to estimate a signal delay associated with each of the subset of signals that include possible candidate ranging codes, and wherein the second component is operable to generate a new signal delay estimate associated with the preferred candidate ranging codes.

14. The system of claim 1, wherein at least one of the first and second components is implemented as one of either an application specific integrate circuit (ASIC) or software instructions executed by a processor.

15. A method for ranging, comprising:
   a subscriber station transmitting a signal including a ranging code;
   a base station receiving the signal from the subscriber station;
   identifying, based on at least one condition, a subset of possible candidate ranging codes from a set of possible ranging codes; and
   selecting a preferred ranging code from the subset of possible candidate ranging codes.

16. The method of claim 15, further comprising:
   monitoring a ranging channel;
   determining a delay estimate of the subscriber station.

17. A base station for ranging synchronization with a subscriber system, comprising:
   a component to analyze a signal to determine a ranging code of the signal, the component operable to analyze a second symbol received within a time period, the second symbol being at least part of the signal, the component further operable to analyze a phase shift aspect of the signal and use at least one threshold condition to determine possible ranging codes.

18. The base station of claim 17, wherein the threshold condition used by the component to determine the subset of signals is a threshold accumulation.

19. The base station of claim 17, wherein the threshold condition used by the component to determine the subset of signals is a threshold number of signals to include in a subset of signals of possible ranging codes.

20. The base station of claim 17, wherein the time period is defined as a duration of a symbol with cyclic prefix received at the base station, and wherein the component is operable to ignore at least portions of a first symbol received within a first time period and analyze the second symbol received within a second time period.

21. The base station of claim 17, wherein the component estimates a signal delay associated with at least one of the possible ranging codes.

22. A base station for ranging synchronization with a subscriber system, comprising:
   a component operable to compare ranging codes in at least some of a set of received signals to at least some of a set of possible ranging codes to determine preferred candidate ranging codes, wherein the component tests a signal window that is two (2) symbols in length, a step size of two (2) times the cyclic prefix is used for each successive two (2) symbol length signal window tested by the component.

23. The system of claim 22, wherein the component is further operable to estimate a signal delay associated with the preferred candidate ranging codes.

* * * * *